No. 761,936. PATENTED JUNE 7, 1904.
S. W. BALDWIN.
SHARPENING DEVICE.
APPLICATION FILED OCT. 9, 1903.
NO MODEL.
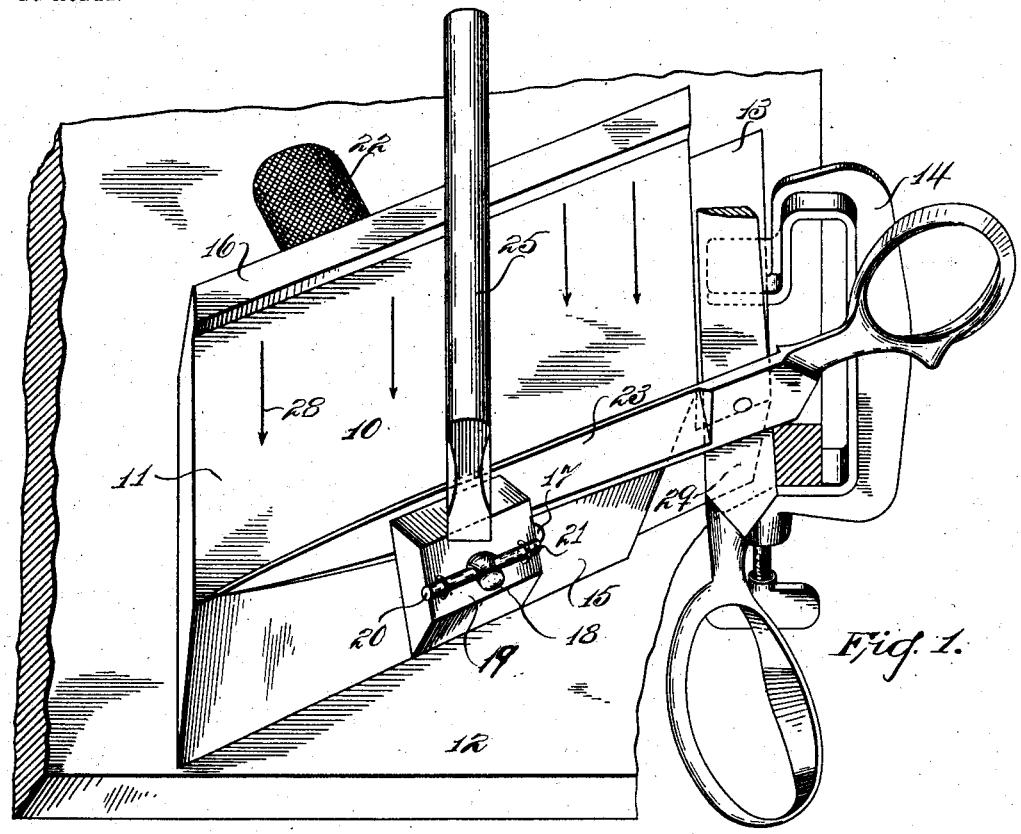
Fig. 1.
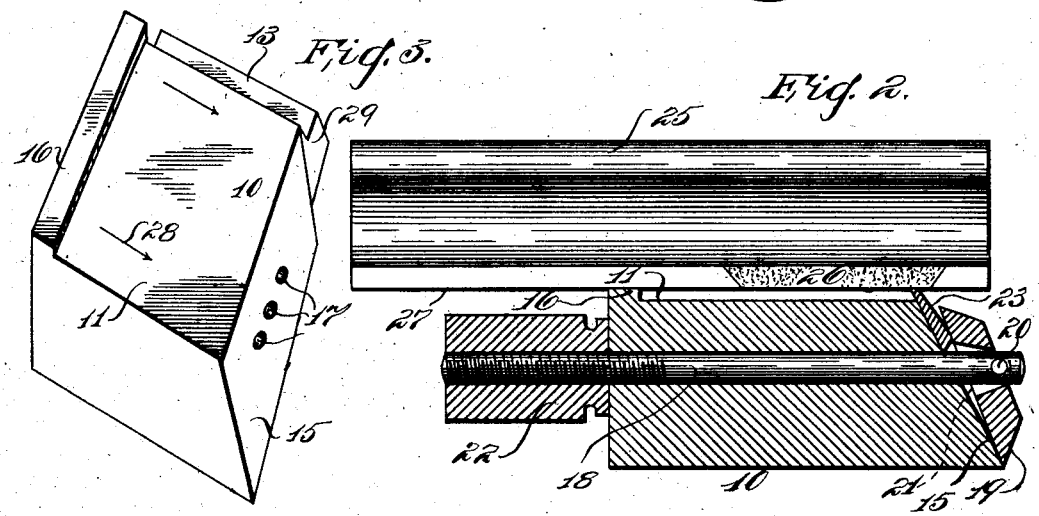
Fig. 3.
Fig. 2.
Witnesses:
Inventor:
S. W. Baldwin.
By his attorney,
F. H. Richards.

No. 761,936. Patented June 7, 1904.

UNITED STATES PATENT OFFICE.

STEPHEN W. BALDWIN, OF NEW YORK, N. Y.

SHARPENING DEVICE.

SPECIFICATION forming part of Letters Patent No. 761,936, dated June 7, 1904.

Application filed October 9, 1903. Serial No. 176,349. (No model.)

*To all whom it may concern:*

Be it known that I, STEPHEN W. BALDWIN, a citizen of the United States, residing in New York, in the county of New York and State of New York, have invented certain new and useful Improvements in Sharpening Devices, of which the following is a specification.

This invention relates to and has for an object to provide a sharpening device for edged tools having their cutting edge formed by the juncture at an angle of a face which may be subjected to attrition with some other face, and particularly to such tools as shears and scissors.

As is well known, the organization of a pair of shears is such that the faces of the two blades which lie against each other when the instrument is closed are substantially flat or plane faces and that the cutting edge is produced by making a beveled edge or face upon the blades, the face of such bevel being at an acute angle to the flat or plane face of the blade, so that as the blades or members of the shears come together in closing there will be presented to the work two sharp edges, each being the juncture of said flat or plane face with the beveled face, and it is necessary in order to perform the functions of cutting properly that the cutting edges should have a proper, well-defined, and true angle to the face of the blade. It is also desirable that the cutting edges should be in a degree serrated— that is, not perfectly smooth. It is also important that the angle of the serrations should be with their cutting-points toward the heels of the blades, this in order to prevent the natural tendency of the material being cut to slide away from the point of cutting. It is difficult for the ordinary user of such implements to resharpen them and get the proper cutting edge or angle, and it is particularly difficult so to do and maintain the proper angle throughout the entire blade, and it is also difficult to get a good cutting edge without "feathering" the same. In my device herein I secure these several very important features by the following means: The blade is firmly clamped to a block or bed with its face at a definite angle and with its cutting edge protruding slightly above the surface of the bed. A sharpening-tool, of emery or other abrasive material of sufficient hardness to hold its form a reasonable time and properly cut away the material on the blade edges to be removed and of a length sufficient to have a bearing upon a guiding surface sufficiently remote from the shear-blade edge and approximately on the same plane as the edge to enable one not skilled to sharpen the cutting edge at its proper uniform angle to the face of the blade, may be employed in connection with the block or bed. To enable the operator to secure a reasonably uniform proper angle of the serrations on the edge of the blade, I provide arrows or parallel lines distinctly marked on the upper surface of the block or bed, these acting as indicators or guides of the proper direction in which the operator should make the abrasive tool travel when doing its work.

In the drawings accompanying and forming a part of this specification a form of my invention is illustrated, wherein—

Figure 1 is a perspective view showing a portion of a table to which is clamped a form of my invention, a pair of shears being shown in connection therewith, one of the blades shown as broken away and the other as clamped in the device, and the sharpening-tool is also shown resting upon the shear-blade and upon the guide-rail. Fig. 2 shows a detail cross-section of the device with a blade in position to be sharpened and the sharpening-tool shown in elevation, and Fig. 3 is a perspective view of the block or bed-plate of the device with the clamping devices removed therefrom.

As illustrated herein, the device comprises what may be termed a "bed-plate" 10, which in the present instance is in form somewhat rhomboidal or lozenge shaped and has a top or plane face 11, which when the device is lying upon a bench or table, as 12, will be uppermost. The body of the bed also has a shelf or projecting portion 13, which will afford a bearing for a clamping device 14, whereby it may be securely clamped to the table to hold it in position during the sharpening operation. What may be termed the "front" face of the bed or block is shown as a slanting face 15, the plane of which face is at an obtuse angle to the plane of the face 11.

At the back of the bed is shown a templet or guide-rail 16, which has a face upon a plane substantially parallel to the plane of the face 11. The bed is provided in the present instance with a number of transverse holes 17, passing from the front to the back, through which a rod or tie-bar 18 may pass, the bar in the present instance passing through a clamping-block 19 and pivotally secured thereto by means of a pin 20, pivoted in a hole in the end of such tie-bar and lying upon the face of the clamping-block. The pin may be held in position by eyes or staples 21. The end of the rod is shown as screw-threaded and having an elongated nut or handle 22 thereon for the purpose of clamping a blade between the clamping-block 19 and the face 15, such nut serving the purpose of a handle to manipulate the device and to hold it when it is not convenient or desirable to employ a clamp to bind it to the table. As seen in Figs. 1 and 2, a shear-blade 23 is shown as having its flat or inner face resting upon the face 15 and clamped thereagainst by the clamping-block 19, its edge protruding beyond the face 11 and substantially the same distance above such face as of the face of the guide-rail 16.

The sharpening-tool in the present instance comprises a body or handle portion 25, which has set into it at one end an abrasive body 26 or a body having an abrasive or grinding surface, and adjacent to such abrasive body or grinding-surface the body portion of the tool is provided with a smooth or antifriction face 27, such face being organized to run upon the rail 16 without altering its contour. As seen in Fig. 2, the sharpening-tool may be moved back and forth across the blade and the abrasive surface will grind down the blade at an angle to the face which lies against the face 15 of the bed, but on the same plane of the rail 16. By the peculiar shape of the bed it will be indicated to the operator that the angle of the sharpening-tool to the angle of the line of the blade will be such that a sharpening will be toward the point of the blade and from the heel, which is generally considered the most desirable direction to move a sharpening-tool over instruments of this character, the arrows 28 indicating also the direction which the tool is to be held in and also indicating which stroke is to be the working stroke of the tool, whereby the metal will be moved on the cutting edge from the inner face outwardly, so that at the juncture of such inner face and the bevel which is produced there will be a clean smooth cutting edge without the presence of any feather or roughness whatever. In Fig. 1 it will be noted that the rhomboidal formation of the bedplate brings the rail toward the right-hand side of such figure and the face 15 toward the left-hand side, so that it will be inconvenient, if not impossible, for the operator to sharpen the instrument by moving the tool in a direction from the point toward the heel, and the position of the device is also such that it will be inconvenient to make the working stroke of the sharpening-tool in the wrong direction, it being, as is well known, more convenient to make the working stroke of any such tool the stroke which is away from the operator and the drawing or return stroke the idle stroke, the organization of the muscles of the hands and arms being such that the greater strength of the normal person can be applied at the pushing stroke than at the pulling stroke of such tools. To accommodate the handle or end of the blade which is not being worked upon by the operator, the face 29 of the extension 13 is cut away or lies back of the face 15. The plurality of holes 17 is to enable the clamp to be placed in various positions to accommodate blades of different characters.

It will of course be apparent that changes in detail may be made in practice without departing from the spirit of my invention.

Although a distinct rail or templet is shown, yet it will be apparent that a face at the proper angle on the block or elsewhere would serve the desired purpose and that the relation of such guide-face to the block is immaterial so long as it is at the proper angle relative to the blade position, and the guide may in some instances not depend upon a plane face, but may present a line or edge to control the tool.

Having thus described my invention, I claim—

1. A shear-sharpener comprising a bed having at one edge a guide-rail and a flat face adjacent to the other edge, a screw-bar passing through the bed, a clamping-block to lie on said flat face; a bar on the outer side of the clamp and running through the screw-bar; and a set-nut on the bar to bind the clamp on a blade and hold the same in position to be acted upon by a tool resting on said rail.

2. In a device of the character specified the combination with a bed, of means to clamp a blade thereto with its cutting edge protruding above the surface of the bed; and a guide for a sharpening-tool also protruding above the bed of substantially the length of the blade position, parallel thereto, and extending in one direction farther than such blade and in the opposite direction a less distance and organized to control the angle of the cutting edge produced by the tool and the angle of such tool relative to the line of the cutting edge.

3. In a shear-sharpener the combination of a bed; a guide for a sharpening-tool; a plate to hold a blade to be sharpened; a rod pivoted thereto and having a screw-threaded portion; and an elongated nut on the screw-threaded portion to actuate the plate and serve as a handle.

4. A shear-sharpening device embodying a portion to support one blade of a pair of shears, a portion to afford a clamp-bearing and a clearance for the other blade adjacent thereto; and means to hold the blade on such supporting portion.

5. A shear-sharpening device comprising a bed, a face on such bed to form a rest for a shear-blade, an extension upon the bed to afford a seat for a removable clamp, a clearance thereon for the other shear-blade, a guide for a sharpening-tool to coöperate with the blade clamped in position to guide the tool upon a plane at a determined angle to the said face on the bed.

6. A shear-sharpening device comprising a bed, a face on such bed to afford a rest for a face of a shear-blade, means to clamp such blade in position, a rest, a guard to hold the other blade away from the region of activity of the sharpening-tool, a guide for a sharpening-tool extending in one direction, farther than the blade-rest face and organized to coöperate with the blade clamped in position to guide the tool upon a plane at a determined angle to the said face on the bed, and means upon the bed to indicate to the operator the position at which to hold the sharpening-tool.

Signed at Nos. 9 to 15 Murray street, New York, N. Y., this 8th day of October, 1903.

STEPHEN W. BALDWIN.

Witnesses:
CHAS. S. RUSSELL,
C. A. WEED.